Patented June 2, 1953

2,640,824

UNITED STATES PATENT OFFICE 2,640,824

POLYAZO DYESTUFFS

Hans Ischer, Ernst Iselin, and Walter Wehrli, Basel, Switzerland, assignors to Sandoz A. G., Basel, Switzerland, a Swiss firm No Drawing. Application February 4, 1952, Serial No. 269,897. In Switzerland February 14, 1951

9 Claims. (Cl. 260—145)

The present invention relates to polyazo dyestuffs.

The new valuable polyazo dyestuffs provided by the present invention correspond to the formula

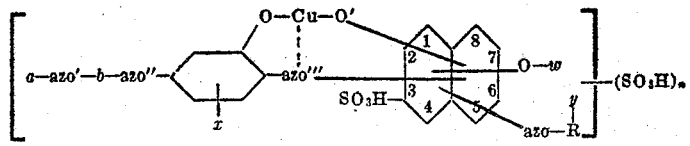

wherein:

$a$ stands for a diazo component radical of the benzene or naphthalene series,
$b$ stands for a middle component radical of the benzene or naphthalene series,
R stands for a radical of the benzene series,
$x$ stands for —H, —CH₃, —OCH₃ or —NH.acyl,
$y$ is attached in ortho-position to —azo—, and stands for —OH, —OCH₃, —COOH, —O— or $$-O-\overset{|}{C}=O$$

the C-atom of the latter substituent being connected with R,
$w$ stands for a hydrogen atom when $y$ denotes —OH, —OCH₃ or —COOH, and stands for —Cu— when $y$ denotes —O— or $$-O-\overset{|}{C}=O$$

being in complex linkage with $y$ and —azo—,
$n$ is a whole number and at least 1, and wherein:

—azo'— stands in para-position to —azo"—, one of the substituents —O'— and —O—$w$ is attached in position 1 of the naphthalene nucleus and the other in position 6, —azo— being attached in position 2 of the naphthalene nucleus when —O—$w$ is in position 1, and in position 5 when —O—$w$ is in position 6, and —azo'''— being attached in position 2 of the naphthalene nucleus when —O'— is in position 1, and in position 5 when —O'— is in position 6.

These new dyestuffs are prepared, according to this invention, by coupling an azo dyestuff of the formula

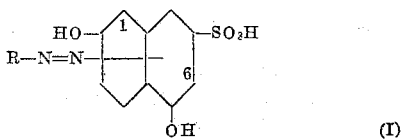

or the copper complex thereof, wherein the azo group is connected to the 1- or 6-positioned carbon atom of the naphthalene nucleus, and R stands for the radical of a diazo component of the benzene series having in ortho-position to the azo group a substituent capable of metal complex formation, or for the radical of a disazodiazo component of the formula

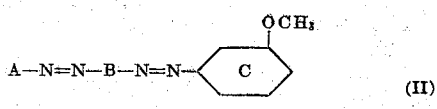

wherein

A stands for the radical of a diazo component of the benzene or naphthalene series,
B stands for a radical of the benzene or naphthalene series, the adjacent azo groups being in p-position with respect to each other,
and wherein the nucleus C may be further substituted by methyl, methoxy or acylamino, the coupling being effected, in those cases where the radical R has the first-mentioned significance, with the diazo component of an aminodisazo dyestuff of the formula

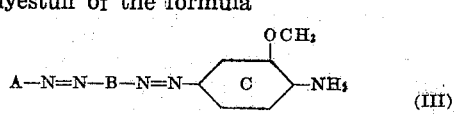

wherein A, B and C have the afore-indicated significances, and in those cases where R has the second-mentioned significance, with the diazo compound of an amine of the benzene series which carries in ortho-position to the amino group a substituent capable of metal complex formation, and then treating the resulting polyazo dyestuff, which should contain at least two sulfonic acid groups, in substance or on the fiber with copper-yielding agents.

Illustrative of diazo components of the benzene series, which correspond to the first-mentioned significance of R, are inter alia the following amines: 2-amino-1-methoxybenzene, 2-amino-1-methoxy-4-methylbenzene, 2-amino-1-methoxy-5-chlorobenzene, 2-amino-1-methoxybenzene-4-sulfonic acid, 2-amino-1-methoxy-5-nitrobenzene-4-sulfonic acid, 2-amino-1-methoxy-5-chlorobenzene-4-sulfonic acid, 2-amino-1-hydroxybenzene-4-sulfonic acid, 2-amino-1-hydroxybenzene-4,6-disulfonic acid, 2-amino-1-hydroxy-6-chlorobenzene-4-sulfonic acid, 2-amino-1-hydroxy-4-chlorobenzene-6-sulfonic acid, 2-amino-1-hydroxy-5-nitrobenzene, 2-amino-1-hydroxy-4-chloro-5-nitrobenzene, 2-amino-1-hydroxy-4-nitrobenzene-6-sulfonic acid, 2-amino-1-hydroxy-6-nitrobenzene-4-sulfonic acid, 2-aminobenzene-1-carboxylic acid, 2-amino-5-nitrobenzene-1-carboxylic acid, 2-amino-5-chlorobenzene-1-carboylic acid, 2-aminobenzene-1-carboxy-4-sulfonic acid, 2-aminobenzene-1-carboxy-5-sulfonic acid, etc.

The aminodisazo dyestuffs corresponding to the second-mentioned significance of R, may for instance be prepared by diazotizing a starting component A, for example 1-aminobenzene-2,5-disulfonic acid, coupling the resultant diazo compound in weakly acid medium with a middle component B, for example 3-amino-1-methylbenzene, further diazotizing the thus-obtained monoazo dyestuff, and coupling the diazotized product with a component capable of metal complex formation, for example 4-methyl-1-methoxy-2-aminobenzene, in weakly acid medium.

However, the aminodisazo dyestuffs corresponding to the aforesaid definition may also be produced by coupling, for example, the diazo compound of 1-amino-4-nitrobenzene-2-sulfonic acid in alkaline medium with a 1-hydroxybenzene-2-carboxylic acid, reducing the nitro group of the resultant monoazo dyestuff by means of sodium sulfide, then further diazotizing and coupling the thus-diazotized product with a middle component capable of metal complex formation, such for example as 1-methoxy-2-amino-4-acetylaminobenzene, in weakly acid medium.

Illustrative of starting or initial components A for the preparation of the said aminodisazo dyestuffs are inter alia: aminobenzene, 1-amino-2-methylbenzene, 1-amino-3-methylbenzene, 1-amino-4-methylbenzene, 1-amino-2,3-dimethylbenzene, 1-amino-2,4-dimethylbenzene, 1-amino-2,5-dimethylbenzene, 1-amino-2,6-dimethylbenzene, 1-aminobenzene-2-sulfonic acid, 1-aminobenzene-3-sulfonic acid, 1-aminobenzene-4-sulfonic acid, 1-aminobenzene-2,4-disulfonic acid, 1-aminobenzene-2,5-disulfonic acid, 1-amino-2-methylbenzene-4-sulfonic acid, 1-amino-2-methylbenzene-5-sulfonic acid, 1-amino-4,6-dimethylbenzene-2-sulfonic acid, 1-aminobenzene-2-carboxylic acid, 1-aminobenzene-3-carboxylic acid, 1-aminobenzene-4-carboxylic acid, 1-amino-4-hydroxybenzene-3-carboxylic acid, 1-amino-3-hydroxybenzene-4-carboxylic acid, 1-amino-3-methyl-4-hydroxybenzene-5-carboxylic acid, 1-amino-4-hydroxybenzene-5-carboxy-3-sulfonic acid, 1-amino-4-acetylaminobenzene-2-sulfonic acid, as well as other aminobenzenes substituted by —SO$_3$H, —COOH, halogen, —OH, alkoxy and/or alkyl groups; also 1-aminonaphthalene, 2-aminonaphthalene, 2-aminonaphthalene-3-carboxylic acid, 1-aminonaphthalene-4-sulfonic acid, 1-aminonaphthalene-5-sulfonic acid, 1-aminonaphthalene-8-sulfonic acid, 1-aminonaphthalene-3,6-disulfonic acid, 1-aminonaphthalene-4,8-disulfonic acid, 1-aminonaphthalene-3,8-disulfonic acid, 2-aminonaphthalene-1-sulfonic acid, 2-aminonaphthalene-6-sulfonic acid, 2-aminonaphthalene-8-sulfonic acid, 2-aminonaphthalene-4,8-disulfonic acid, 2-aminonaphthalene-5,7-disulfonic acid, 2-aminonaphthalene-6,8-disulfonic acid, 2-aminonaphthalene-3,6-disulfonic acid, 1-aminonaphthalene-3,6,8-trisulfonic acid, as well as other aminonaphthalene sulfonic acids.

Illustrative of middle components B are inter alia: aminobenzene, 1-amino-3-methylbenzene, 1-amino-2,5-dimethylbenzene, 1-amino-2-methoxybenzene, 1-amino-3-methoxybenzene, 1-amino-2-methyl-5-methoxybenzene, 1-amino-2,5-dimethoxybenzene, 1-amino-2,5-diethoxybenzene, 1-amino-3-acetylaminobenzene, 1-amino-2-methoxy-5-acetylaminobenzene, 1-aminonaphthalene, 1-aminonaphthalene-6-sulfonic acid, 1-aminonaphthalene-7-sulfonic acid, 1-amino-2-methoxynaphthalene, 1-amino-2-ethoxynaphthalene, 1-amino-2-methylnaphthalene, 1-amino-2-methoxynaphthalene-6-sulfonic acid, 1-amino-2-ethoxynaphthalene-6-sulfonic acid, etc. Instead of a monoazo dyestuff from an initial component A and a middle component B, it is also possible to use for example 4-amino-1,1'-azobenzene, 4-amino-1,1'-azobenzene-4'-sulfonic acid or 4-amino-1,1'-azobenzene-3,4'-disulfonic acid.

Illustrative of amines of nucleus C are inter alia: 1-amino-2-methoxybenzene, 1-amino-2-methoxy-5-methylbenzene, 1-amino-2,5-dimethoxybenzene, 1-amino-2-methoxy-5-acetylaminobenzene, 1-amino-2-methoxy-5-formylaminobenzene, 1-amino-2-methoxy-5-benzoylaminobenzene, 1-amino-2-methoxy-5-cinnamoylaminobenzene, etc.

The azo dyestuffs of composition (I), supra, which are derived from 2,5-dihydroxynaphthalene and which serve as coupling components for the preparation of the polyazo dyestuffs may be obtained for example from the corresponding 2-amino-5-hydroxynaphthalene-7-sulfonic acid dyestuffs by replacement of the 2-positioned amino group by an hydroxyl group or by coupling onto 2,5-dihydroxynaphthalene-7-sulfonic acid. The combining of these dyestuffs to the polyazo dyestuffs may, in many cases, advantageously be carried out with the copper complex compounds of the dyestuffs and in the presence of an organic base such as pyridine, quinoline, etc. at temperatures of 0 to 60° C.

The afore-enumerated components are selected, according to the invention, so that the final dyestuffs contain at least two sulfonic acid groups. By definition, moreover, these dyestuffs also contain at least two copperable azo bridges. However, additional groupings capable of copper complex formation may be present, as for instance in the case where A is the radical of 2-hydroxybenzene-1-carboxylic acid.

The new polyazo dyestuffs, which dye cotton and regenerated cellulose in gray shades of good fastness to light and to washing, can be aftercoppered on the fiber, the resultant dyeings being of excellent fastness to light and washing. They may also be converted into the copper complex compounds in substance, in which case the treatment with copper-yielding agents is advantageously carried out in such manner that the methoxy groups are split. This may be effected according to various methods known from the literature, for example by heating with copper salts in weakly acid to alkaline medium in the presence or absence of ammonia, organic bases, and optionally with the use of superatmospheric pressure, or in a fusion of alkali salts of low molecular weight aliphatic carboxylic acids. The copper complex compounds dye cotton and regenerated cellulose in reddish to greenish gray shades of outstanding fastness to light and to washing.

The following examples set forth representative exemplary embodiments of the invention, and these examples are intended to be solely illustrative and not at all limitative. In these examples, the parts and percentages are by weight and the temperatures are expressed in degrees centigrade.

*Example 1*

52.9 parts of the aminodisazo dyestuff, obtained by coupling diazotized 2-hydroxy-5-aminobenzene-1-carboxylic acid with 1-aminonaphthalene-7-sulfonic acid, further diazotizing and coupling with 2-amino-1-methoxy-4-methylbenzene, are stirred into 500 parts of water, 7 parts of sodium nitrite added, and the resultant mass then adjusted so that it is acid to Congo by the addition of 50 parts of concentrated hydrochloric acid at 10–12° and while stirring thoroughly. The diazotization will be completed in 2 to 3 hours. The obtained diazo suspension is then added at room temperature to a solution of 45 parts of the copper complex of the monoazo dyestuff, obtained by the acid coupling of diazotized 2-aminobenzene-1-carboxylic acid with 2-amino-5-hydroxynaphthalene-7-sulfonic acid, followed by replacement of the amino group by hydroxyl and coppering, in 400 parts of water, 1000 parts of pyridine and 25 parts of concentrated aqueous ammonia, whereby coupling to form the tetrakisazo dyestuff takes place instantaneously. The mass is then adjusted to weak acidity with glacial acetic acid, filtered, and the thus-separated product stirred in 1000 parts of water, made alkaline with sodium carbonate and the dyestuff salted out and filtered off.

The new dyestuff dyes cotton and regenerated cellulose in gray shades which, upon aftertreatment with copper salts, becomes fast to light and to washing.

For conversion thereof into the copper complex in substance, the dyestuff is dissolved in 1500 parts of water at 90°, admixed with a solution of 24.9 parts of crystallized copper sulfate in 100 parts of water and 25 parts of concentrated aqueous ammonia, and stirred for 6 to 10 hours at 90 to 95°, until the methoxy groups are split. The resultant dyestuff, which corresponds to the formula

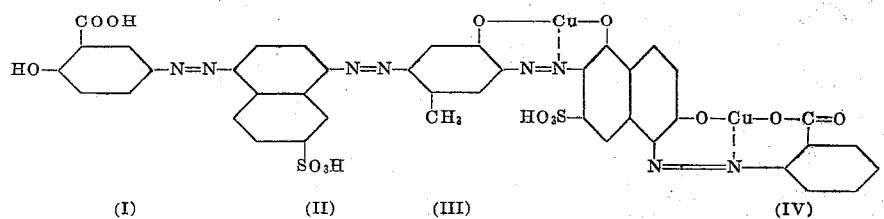

is salted out, filtered off and dried under reduced pressure at 90°.

The identical dyestuff can be prepared by combining the diazo compound of the aminodisazo dyestuff in the presence of sodium bicarbonate with 2,5-dihydroxy-naphthalene-7-sulfonic acid, then coupling the resultant coupling product in the presence of pyridine with diazotized 2-aminobenzene-1-carboxylic acid to form the tetrakisazo dyestuff, and then subjecting the latter to demethylating coppering in the precedingly described manner.

Dyestuffs with similar properties are obtained when, while otherwise proceeding as aforedescribed in the present example, the initial component corresponding to (I) is replaced by the equivalent amount of 2-hydroxy-1-carboxy-5-aminobenzene-3-sulfonic acid, 2-hydroxy-1-carboxy-3-aminobenzene-5-sulfonic acid, 2-hydroxy-1-carboxy-5-amino-3-methylbenzene, 2-hydroxy-1-carboxy-5-amino-4-methylbenzene, 2-hydroxy-1-carboxy-4-aminobenzene or 2-hydroxy-1-carboxy-5-amino-3-chlorobenzene, or, when starting with any of the above initial components, the middle component corresponding to (II) is replaced by the corresponding amount of 1-aminonaphthalene-6-sulfonic acid, 1-amino-2-methoxynaphthalene-6-sulfonic acid or 1-amino-2-ethoxynaphthalene-6-sulfonic acid, or when, in any one of the aforementioned combinations, the second middle component corresponding to (III) is replaced by the corresponding amount of 1-methoxy-2-aminobenzene, 1-methoxy-2-amino-4-acetylaminobenzene, 1-methoxy-2-amino-4-formylaminobenzene, 1-methoxy-2-amino-4-benzoylaminobenzene, 1-methoxy-2-amino-4-toluylaminobenzene, 1-methoxy-2-amino-4-cinnamoylaminobenzene or 1,4-dimethoxy-2-aminobenzene, or when, in any of the precedingly described combinations, the moiety (IV) is replaced by the radical of 2-amino-1-carboxybenzene-4-sulfonic acid, 2-amino-1-carboxybenzene-5-sulfonic acid, 2-aminobenzene-1,5-dicarboxylic acid, 2-aminobenzene-1,4-dicarboxylic acid, 2-amino-5-chlorozenzene-1-carboxylic acid, 2-amino-5-nitrobenzene-1-carboxylic acid, 2-amino-1-methoxybenzene, 2-amino-1-methoxybenzene-4-sulfonic acid, 2-amino-1-methoxybenzene-5-sulfonic acid, 2-amino-5-acetylaminobenzene-1-carboxylic acid, 2-amino-5-benzoylaminobenzene-1-carboxylic acid, 2-amino-1-hydroxy-5-nitrobenzene, 2-amino-1-hydroxy-4-chloro-5-nitrobenzene, 2-amino-1-methoxy-4-nitrobenzene, 2-amino-1-hydroxy-4-chlorobenzene-6-sulfonic acid, 2-amino-1-hydroxy-4-nitrobenzene-6-sulfonic acid, 2-amino-1-hydroxy-6-nitrobenzene-4-sulfonic acid or 2-amino-1-hydroxy-4-chloro-6-nitrobenbene, 2-amino-1-methoxy-5-nitrobenzene-4-sulfonic acid, or 2-amino-1-hydroxy-6-chlorobenzene-4-sulfonic acid.

In similar manner, the dyestuff of the formula

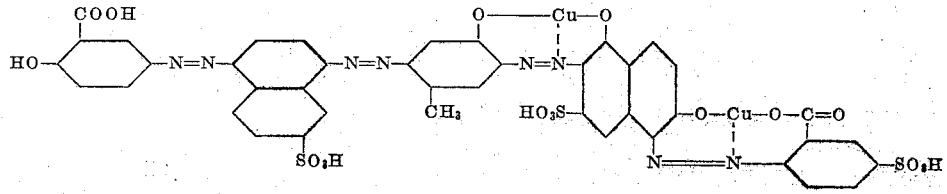

can for example also be prepared, and this dyestuff yields dyeings of very similar properties on cotton or regenerated cellulose.

Example 2

57.3 parts of the aminodisazo dyestuff, obtained by coupling diazotized 2-hydroxy-1-carboxy-5-aminobenzene-3-sulfonic acid with 3-amino-1-methylbenzene, further diazotizing and coupling with 2-amino-1-methoxy-4-methylbenzene, are diazotized in the manner described in Example 1 and then added at 0 to 5° to a solution of 53 parts of the copper complex of the monoazo dyestuff, obtained by the acid coupling of diazotized 2-amino-1-carboxybenzene-4-sulfonic acid with 2-amino-5-hydroxynaphthalene-7-sulfonic acid, followed by replacement of the amino group by hydroxyl and coppering, in 250 parts of water, 800 parts of pyridine and 25 parts of concentrated aqueous ammonia. The coupling to the tetrakisazo dyestuff takes place very quickly. The readily-soluble dyestuff is heated to 90° and is then coppered at 90–95° by the addition of 25 parts of crystallized copper sulfate, dissolved in 100 parts of water, until the methoxy group is split. The finished dyestuff, which corresponds to the formula thalene, or when, in any of the foregoing combinations, the components corresponding to (III) and (IV) are replaced by one of the components (III) and (IV) mentioned in Example 1.

Example 3

56.7 parts of the disazo dyestuff, obtained by coupling diazotized 2-aminonaphthalene-4,8-disulfonic acid with 3-amino-1-methylbenzene, further diazotizing and coupling with 2-amino-1,4-dimethoxybenzene, are diazotized as in Example 1, and the obtained diazo compound combined at room temperature with the solution of 49.6 parts of the copper complex of the monoazo dyestuff, obtained by the acid coupling of diazotized 2-amino-5-nitrobenzene-1-carboxylic acid with 2-amino-5-hydroxynaphthalene-7-sulfonic acid, followed by replacement of the amino group by hydroxyl and then conversion into the copper complex, in 600 parts of water and 1500 parts of pyridine. After heating for two more hours at 50–60°, the coupling is completed. The obtained dyestuff solution is then heated to 90° and, to effect the coppering of the tetrakisazo dyestuff, 25 parts of crystallized copper sulfate, dissolved in 100 parts of water and 25 parts of concentrated aqueous ammonia, are added and

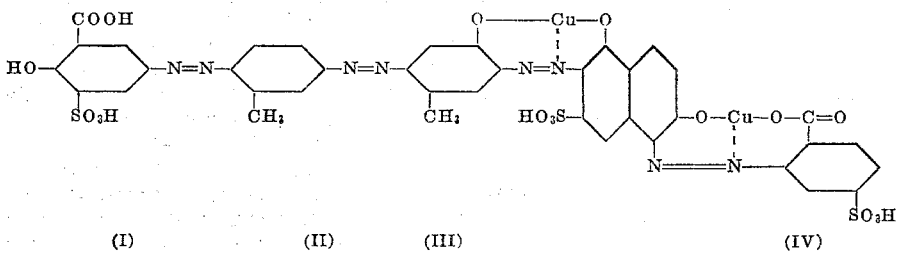

is filtered off, after adjustment of the mass to weak acidity by means of glacial acetic acid, and is then stirred into 1000 parts of water and converted into the sodium salt by the addition of sodium carbonate. The product is then salted out, filtered off and dried at 90° under reduced pressure.

The new dyestuff is a black powder and dyes the mixture stirred for 8 to 10 hours at 90 to 95° until formation of the copper complex, with splitting of the methoxy group, is completed. The dyestuff is then isolated after the manner described in Example 2 and converted into the sodium salt, precipitated, filtered off and dried at 90°.

The new dyestuff of the formula

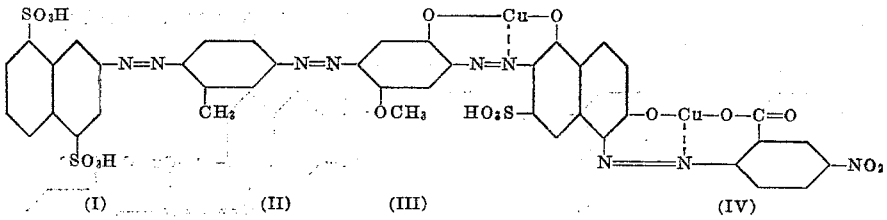

cotton and regenerated cellulose in greenish gray shades of very good fastness to light and to washing. By aftertreatment on the fiber with copper salts, the wet fastness properties are further improved.

Dyestuffs with similar properties are obtained when while otherwise proceeding as precedingly described in this example, the initial component corresponding to (I) is replaced by an equivalent quantity of 2 - hydroxy - 1 - carboxy-3-aminobenzene-5-sulfonic acid, or when, starting from the aforesaid initial components, the middle component corresponding to (II) is replaced by the equivalent quantity of aminobenzene, 2-amino - 1 - methoxybenzene, 2 - amino - 1,4 - dimethylbenzene, 2-amino-1,4-dimethoxybenzene, 2-amino-1,4-diethoxybenzene, 3-amino-1-acetylaminobenzene, 2 - amino - 1 - methoxy-4-acetylaminobenzene, 1-aminonaphthalene, 1-amino-2-methoxynaphthalene or 1-amino-2-ethoxynaphis a dark powder and dyes cotton and regenerated cellulose in greenish gray shades of outstanding fastness to light and very good wet fastness properties.

Dyestuffs with similar properties are obtained when, while otherwise proceeding and aforedescribed in this example, the initial component corresponding to (I) is replaced by an equivalent amount of 2 - aminonapthalene - 5,7 - disulfonic acid, 2-aminonaphthalene-6,8-disulfonic acid, 2-aminonaphthalene-3,6-disulfonic acid, 1-aminonaphthalene-3,6-disulfonic acid, 1-aminonaphthalene - 3,8 - disulfonic acid, 1-aminonaphthalene-4,8-disulfonic acid, 1-amino-naphthalene-3,6,8-trisulfonic acid, 1-amino-8-hydroxynaphthalene-3,6-disulfonic acid, 1-aminobenzene-2,4-disulfonic acid or 1-aminobenzene-2,5-disulfonic acid, or when, starting from any one of the above initial components, the first middle component corresponding to (II) is replaced by an equivalent quantity of one of the (II) compounds mentioned in Examples 1 and 2, or when, in any of the preceding combinations, the components corresponding to (III) and (IV) are replaced by any of the components (III) and (IV) enumerated in Example 1.

tion of the copper complex. The dyestuff solution is thereupon acidified with glacial acetic acid, the precipitated dyestuff is filtered off and is then converted into the sodium salt by precipitation from soda-alkaline solution. The dyestuff, which corresponds to the formula

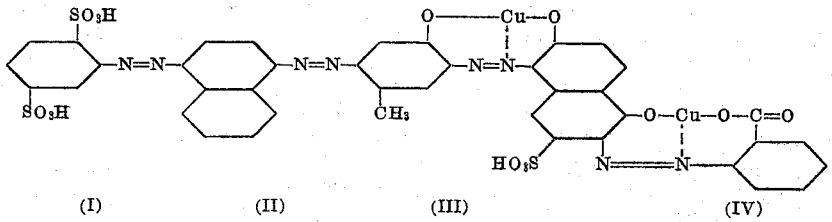

Thus, in analogous manner, the dyestuffs of the following formulae may be prepared:

is isolated and dried at 90° under reduced pressure. It is a dark powder and dyes cotton and

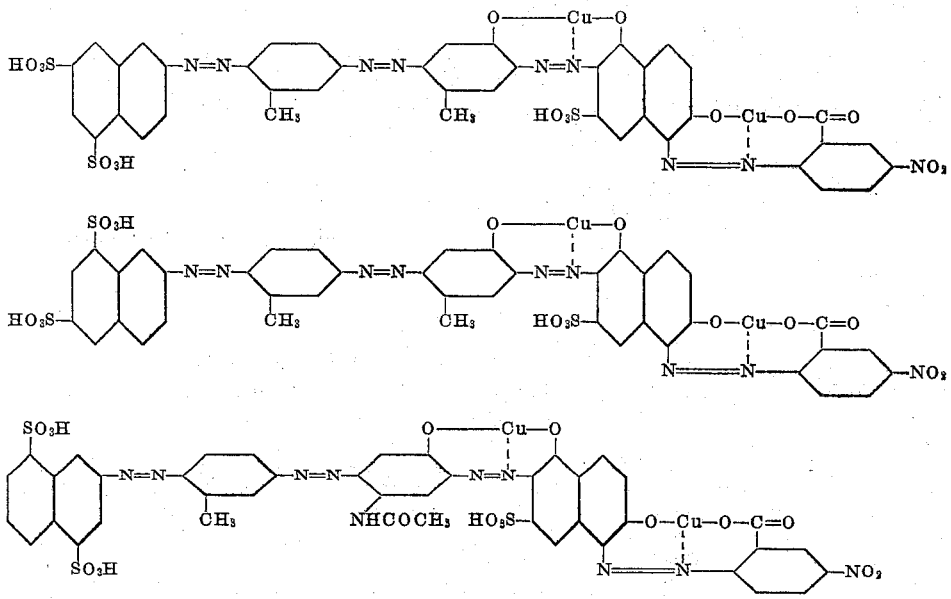

Dyeings on cotton or regenerated cellulose, prepared with these dyestuffs, are also greenish gray and very fast to light and to washing.

Example 4

13.7 parts of 2-aminobenzene-1-carboxylic acid are dissolved in 200 parts of water and 25 parts of hydrochloric acid of 30% strength, and diazotized at 0–5° with 6.9 parts of sodium nitrite. The diazonium solution is combined at 10° with the strongly soda-alkaline (sodium carbonate) solution of 24 parts of 2,5-dihydroxynaphthalene-7-sulfonic acid. The monoazo dyestuff forms immediately and, upon completion of the coupling, is salted out and filtered off. The thus-obtained coupling component is dissolved in 300 parts of water, 750 parts of pyridine and 25 parts of concentrated aqueous ammonia and is combined at 40° with the diazonium solution, obtained according to Example 1, from 52.7 parts of the disazo dyestuff obtained by coupling diazotized 1-aminobenzene-2,5-disulfonic acid with 1-aminonaphthalene, further diazotizing and coupling with 2-amino-1-methoxy-4-methylbenzene. After stirring for 5 hours, the coupling is complete. For conversion into the copper complex, the whole is heated to 90°, a solution of 50 parts of crystallized copper sulfate in 300 parts of water is added, and stirring continued at 90–95° until the methoxy group is split, with formaregenerated cellulose in gray shades of excellent fastness to light and to washing.

Dyestuffs with similar properties are obtained when, while otherwise proceeding as described in this example, the components corresponding to (I), (II), (III) and (IV) are severally replaced by the corresponding components enumerated in Example 3.

Example 5

92 parts of the trisazo dyestuff, obtained by coupling diazotized 1-aminonaphthalene-4-sulfonic acid with 1-aminonaphthalene-7-sulfonic acid, further diazotizing and coupling with 1 - methoxy - 2 - amino - 4 - acetylaminobenzene and then again diazotizing and coupling with 2,5-dihydroxynaphthalene-7-sulfonic acid in the presence of sodium bicarbonate, are dissolved in 600 parts of water, 1000 parts of pyridine and 25 parts of concentrated aqueous ammonia. To the resultant solution, there is added dropwise at 20° an aqueous suspension of the diazo compound from 20.3 parts of 1-methoxy-2-aminobenzene-4-sulfonic acid. Thereafter, the mixture is stirred at room temperature overnight. For conversion into the copper complex, the dyestuff solution is then heated to 90°, a solution of 50 parts of crystallized copper sulfate in 300 parts of water added, and stirring continued at 90–95° for 10 hours until the methoxy groups are split. The resultant tetrakisazo dyestuff of the formula

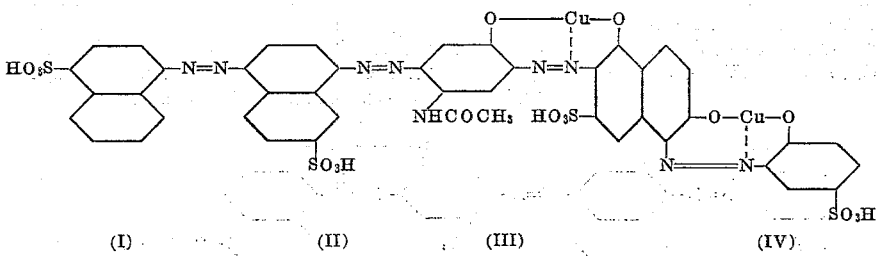

is then worked up after the manner described in the preceding examples and is dried at 90°.

The new dye stuff dyes cotton and regenerated cellulose in gray shades of outstanding fastness properties.

Dyestuffs of similar properties are obtained when, while otherwise proceding as described in the present example, the initial component corresponding to (I) is replaced by an equivalent quantity of 2-aminonaphthalene-1-sulfonic acid, 2-aminonaphthalene-6-sulfonic acid, 2-aminonaphthalene-5-sulfonic acid, 2-aminonaphthalene-8-sulfonic acid, 1-aminonaphthalene-8-sulfonic acid, 1-aminonaphthalene-7-sulfonic acid, 1-aminonaphthalene-6-sulfonic acid, 1-aminonaphthalene-5-sulfonic acid, 1-aminobenzene-2-sulfonic acid, 1-aminobenzene-3-sulfonic acid, 1-aminobenzene-4-sulfonic acid, 2-amino-1-methylbenzene - 4 - sulfonic acid, 2 - amino - 1-methylbenzene-5-sulfonic acid, 2 - amino - 1,5-dimethylbenzene-3-sulfonic acid, 2-amino-1-methoxybenzene-4-sulfonic acid amide, 2-amino-1-carboxybenzene-4-sulfonic acid, 2-amino-1-carboxybenzene-5-sulfonic acid, 1-amino-4-acetylaminobenzene-2-sulfonic acid, 1-amino-2-chlorobenzene-4-sulfonic acid, 4-aminobenzene-1-carboxylic acid, 2-aminobenzene-1,5-dicarboxylic acid, 2-aminobenzene-1,4-dicarboxylic acid or any of the initial components mentioned in Example 3, or when, starting from any one of the above initial components, the components corresponding to (II), (III) and (IV) are replaced by equivalent amounts of the (II), (III) and (IV) components enumerated in Example 1.

Thus, for example, the dyestuffs of the formula

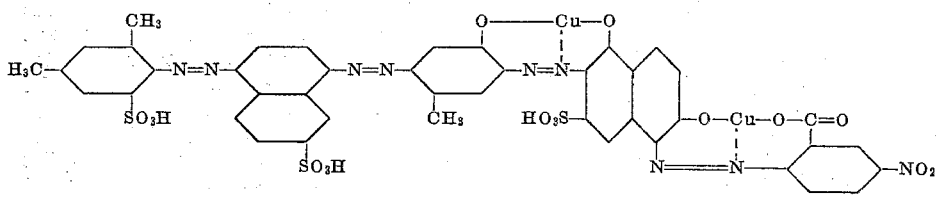

is prepared in this manner; it is characterized by properties very similar to those of the initially described dyestuff of the present example.

Example 6

52 parts of the aminodisazo dyestuff, obtained by coupling diazotized 4-aminoazobenzene-3,4'-disulfonic acid with 1,4-dimethoxy-2-aminobenzene, are dissolved under neutral conditions in 500 parts of water, 7 parts of sodium nitrite added, and the whole adjusted with 50 parts of hydrochloric acid of 30% strength at 15° so that it is acid to Congo. The resultant diazonium compound is run into a solution of 45 parts of the monoazo dyestuff used as coupling component in Example 1 in 400 parts of water, 1,000 parts of pyridine and 25 parts of concentrated aqueous ammonia. The coppering and isolation of the resultant tetrakisazo dyestuff is carried out as in Example 1.

The new dyestuff of the formula

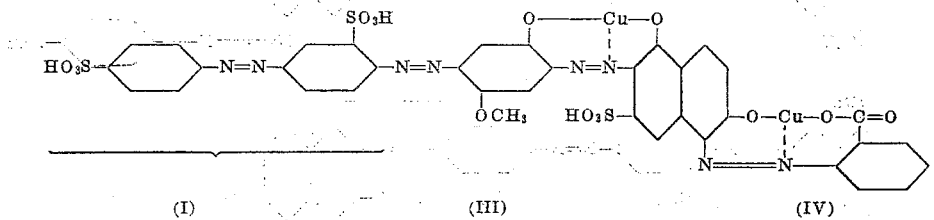

dyes cotton and regenerated cellulose in gray shades of very good fastness to light and to washing.

Dyestuffs with similar properties are obtained when, while otherwise proceeding as described in this example, the azo component corresponding to (I) is replaced by an equivalent quantity of 4-aminoazobenzene-4'-sulfonic acid or 4-aminoazotoluol-4'-sulfonic acid, or when in the above combinations the components corresponding to (III) and (IV) are severally replaced by one of the (III) and (IV) compounds set forth in Example 1.

Example 7

46.5 parts of the aminodisazo dyestuff, obtained by coupling diazotized 1-amino-4-nitrobenzene-2-sulfonic acid with 2-hydroxybenzene-1-carboxylic acid, then reducing the nitro group of the monoazo dyestuff with sodium sulfide, and further diazotizing and coupling with 1-methoxy-2-amino-4-methylbenzene, are diazotized after the manner described in Example 1 and then coupled with 48.5 parts of the copper complex of the monoazo dyestuff obtained by the acid coupling of diazotized 2-amino-5-chlorobenzene-1-carboxylic acid with 2-amino-5-hydroxynaphthalene-7-sulfonic acid, followed by replacement of the amino group by hydroxyl and then coppering; and the resultant product then subjected to demethylating coppering followed by isolation of the final dyestuff.

The new dyestuff corresponds to the formula

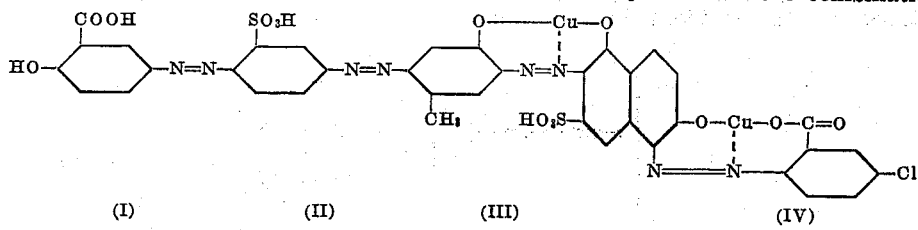

and dyes cotton and regenerated cellulose in gray shades of excellent fastness properties. The fastness to washing can be further enhanced by aftercoppering on the fiber.

Similar dyestuffs, also characterized by excellent properties, are obtained when, while otherwise proceeding as aforedescribed in this example, the component corresponding to (I) is replaced by the equivalent amount of 2-hydroxy-1-carboxybenzene-3-sulfonic acid, 2-hydroxy-1-methylbenzene-3-carboxylic acid, 3-hydroxy-1-methylbenzene-4-carboxylic acid, 2-hydroxy-3-chlorobenzene-1-carboxylic acid, 2-hydroxy-naphthalene-3-carboxylic acid or 1-hydroxy-naphthalene-2-carboxylic acid, or when in any of the above combinations the components corresponding to (III) and (IV) are severally replaced by one of the (III) and (IV) compounds enumerated in Example 1.

Example 8

81.5 parts of the aminodisazo dyestuff, obtained by coupling diazotized 1-aminonaphthalene with 1-aminonaphthalene-7-sulfonic acid and then further diazotizing and coupling with 1-methoxy-2-amino-4-methylbenzene, are diazotized in the manner described in Example 3 and then coupled at 20° with the monoazo dyestuff used as coupling component in Example 2, in the presence of pyridine and ammonia. The demethylating coppering and isolation of the tetrakisazo dyestuff is carried out as described in the preceding examples. The thus-obtained dyestuff of the formula

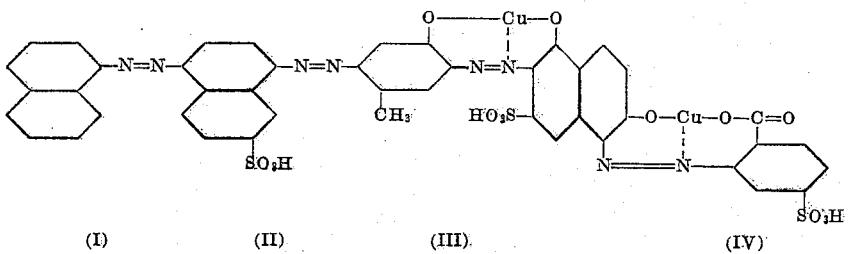

dyes cotton and regenerated cellulose in gray shades of outstanding fastness to light and to washing.

Dyestuffs with similar properties are obtained when, while otherwise proceeding as aforedescribed in this example, the initial component corresponding to (I) is replaced by the equivalent quantity of 2-aminonaphthalene, aminobenzene, 2-amino-1-methylbenzene, 3-amino-1-methylbenzene, 4-amino-1-methylbenzene, 1-amino-2,5-dimethylbenzene, 1-amino-2,6-dimethylbenzene or 1-amino-3,5-dimethylbenzene, or when in any of the above combinations the components corresponding to (II), (III) and (IV) are severally replaced by the corresponding (II), (III) and (IV) compounds enumerated in Example 1.

Example 9

1 part of the dyestuff according to Example 3 (paragraphs 1 and 2) is dissolved in 3000 parts of water and, to the resultant solution, 5 parts of Glauber's salt are added. The obtained dyebath is warmed to 50°, and 100 parts of cotton are introduced thereinto at this temperature. The dyebath is then heated to 95° in the course of 15 to 20 minutes and maintained at this temperature for 15 minutes. Then an additional 5 to 15 parts of Glauber's salt are added and the dyeing continued at 95° for about 30 more minutes. After the bath has then cooled to 50°, the dyed material is withdrawn, rinsed thoroughly and dried. A greenish gray dyeing is obtained which is of outstanding fastness to light and also has good wet fastness properties.

Having thus disclosed the invention, what is claimed is:

1. A dyestuff corresponding to the general formula

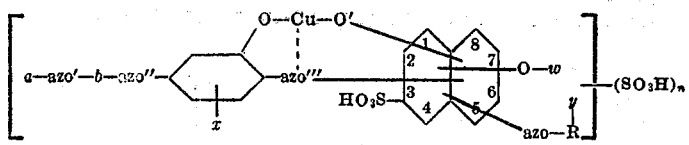

wherein $a$ stands for a member selected from the group consisting of diazo component radicals of the benzene and naphthalene series, $b$ stands for a member selected from the group consisting of middle component radicals of the benzene and naphthalene series, R stands for a radical of the benzene series, $x$ stands for a member selected from the group consisting of —H, —CH$_3$, —OCH$_3$ and —NH.acyl, $y$ is attached in ortho-position to —azo— and stands for a member selected from the group consisting of —OH, —OCH$_3$, —COOH, —O— and $$-O-C=O$$

the C-atom of the latter substituent being connected with R, $w$ stands for a hydrogen atom when $y$ denotes —OH, —OCH$_3$ or —COOH, and stands for —Cu— when $y$ denotes —O— or $$-O-C=O$$

being connected in complex linking with $y$ and

—azo—, $n$ is a whole number and at least 1, and wherein —azo'— stands in para-position to —azo''—, one of the substituents —O'— and —O—$w$ is attached in position 1 of the naphthalene nucleus and the other in position 6, —azo— being attached in position 2 of the naphthalene nucleus when —O—$w$ is in position 1, and in position 5 when —O—$w$ is in position 6, and —azo'''— being attached in position 2 of the naphthalene nucleus when —O'— is in position 1, and in position 5 when —O'— is in position 6.

2. A dyestuff corresponding to the general formula

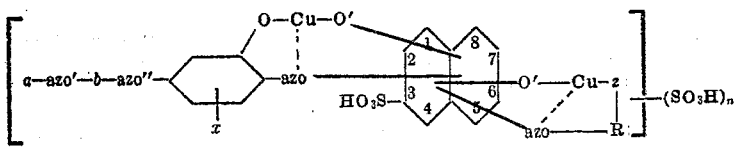

wherein $a$ stands for a member selected from the group consisting of diazo component radicals of the benzene and naphthalene series, $b$ stands for a member selected from the group consisting of middle component radicals of the benzene and naphthalene series, R stands for a radical of the benzene series, $x$ stands for a member selected from the group consisting of —H, —CH$_3$, —OCH$_3$ and —NH.acyl, $z$ is attached in ortho-position to the respective azo-group —$z$—R— stands for a member selected from the group consisting of —O—R— and

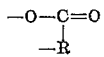

$n$ being a whole number and at least 1, and wherein —azo'— stands in para-position to —azo''—, one of the —O'— atoms is attached in position 1 of the naphthalene nucleus and the other in position 6, and one of the —azo— groups is attached in position 2 of the naphthalene nucleus and the other in position 5.

3. A dyestuff corresponding to the general formula

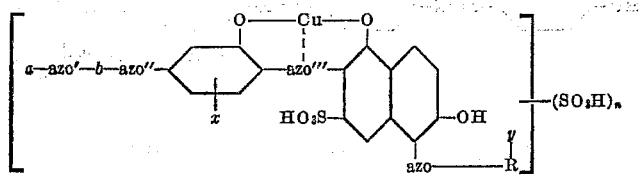

wherein $a$ stands for a member selected from the group consisting of diazo component radicals of the benzene and naphthalene series, $b$ stands for a member selected from the group consisting of middle component radicals of the benzene and naphthalene series, R stands for a radical of the benzene series, $x$ stands for a member selected from the group consisting of —H, —CH$_3$, —OCH$_3$ and —NH.acyl, $y$ is attached in ortho-position to —azo— and stands for a substituent selected from the group consisting of —OH, —OCH$_3$ and —COOH, $n$ is a whole number and at least 1, and wherein —azo'— stands in para-position to —azo''—.

4. A dyestuff corresponding to the general formula

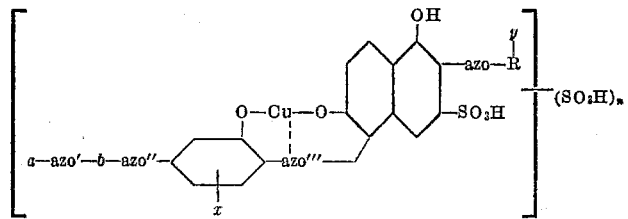

wherein $a$ stands for a member selected from the group consisting of diazo component radicals of the benzene and naphthalene series, $b$ stands for a member selected from the group consisting of middle component radicals of the benzene and naphthalene series, R stands for a radical of the benzene series, $x$ stands for a member selected from the group consisting of —H, —CH$_3$, —OCH$_3$ and —NH.acyl, $y$ is attached in ortho position to —azo— and stands for a substituent selected from the group consisting of —OH, —OCH$_3$ and —COOH, $n$ is a whole number and at least 1, and wherein —azo'— stands in para-position to —azo''—.

5. The dyestuff of the formula

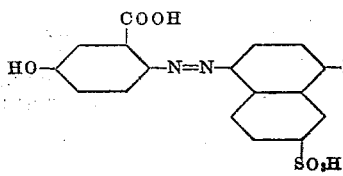 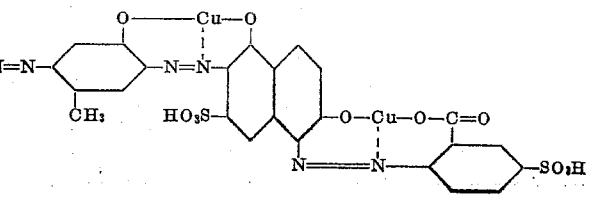

6. The dyestuff of the formula
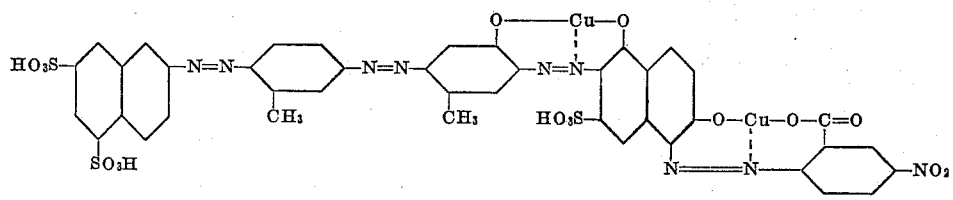
7. The dyestuff of the formula
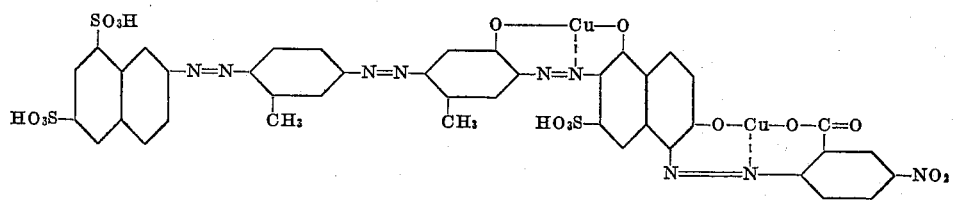
8. The dyestuff of the formula
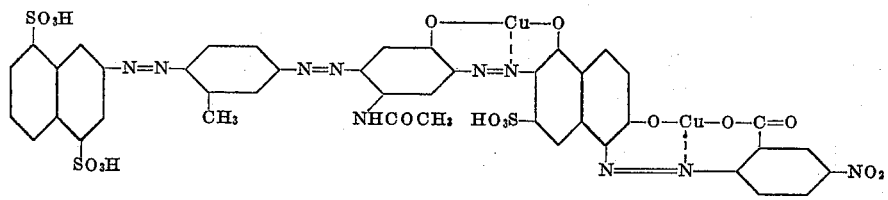
9. The dyestuff of the formula
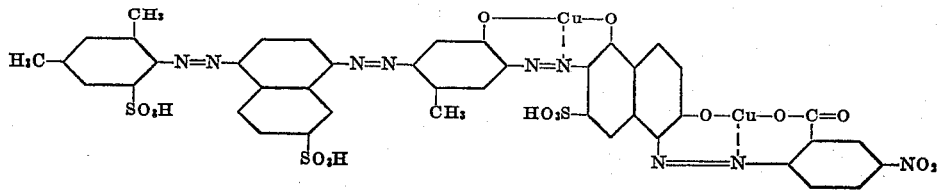
HANS ISCHER.
ERNST ISELIN.
WALTER WEHRLI.
No references cited.